US012692012B2

(12) United States Patent
De Brouwer

(10) Patent No.: US 12,692,012 B2
(45) Date of Patent: Jul. 28, 2026

(54) EMERGENCY POWER GENERATION SYSTEM FOR AN AIRCRAFT

(71) Applicant: AIRBUS OPERATIONS, S.L.U., Madrid (ES)

(72) Inventor: Gabrielle Josephine Christiane De Brouwer, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 19/271,479

(22) Filed: Jul. 16, 2025

(65) Prior Publication Data

US 2026/0021900 A1 Jan. 22, 2026

(30) Foreign Application Priority Data

Jul. 18, 2024 (EP) ..................................... 24382788

(51) Int. Cl.
B64D 41/00 (2006.01)
B64D 13/06 (2006.01)

(52) U.S. Cl.
CPC .... B64D 41/007 (2013.01); *B64D 2013/0611* (2013.01); *B64D 2013/0618* (2013.01)

(58) Field of Classification Search
CPC .......... B64D 41/007; B64D 2013/0611; B64D 2013/0618; B64D 2013/0644; B64D 2033/0213; F02C 7/32
See application file for complete search history.

(56) References Cited

U.S. PATENT DOCUMENTS

| | | | |
|---|---|---|---|
| 2,499,376 A | 3/1950 | Ferrill, Jr. | |
| 2011/0067393 A1 | 3/2011 | Chase | |
| 2011/0204628 A1 | 8/2011 | Darnis | |
| 2013/0048780 A1 * | 2/2013 | Masoudipour | F02C 7/32 244/58 |
| 2017/0057650 A1 | 3/2017 | Walter-Robinson | |

FOREIGN PATENT DOCUMENTS

FR 3050720 A1 * 11/2017 ............. B64D 27/31

OTHER PUBLICATIONS

Extended European Search Report for EP Application No. 24382788.8 dated Nov. 19, 2024, 13 pages.

* cited by examiner

*Primary Examiner* — Valentina Xavier
(74) *Attorney, Agent, or Firm* — Nixon & Vanderhye P.C.

(57) ABSTRACT

An emergency power generation system within a main duct of an aircraft that includes: a rotating electric machine operable in a generator mode and a motor mode; a control unit; a first switch in communication with the control unit to select the generator or motor mode; an air outlet actuator in communication with the control unit that selectively opens and closes an air outlet of the main duct; an airflow passage controller in communication with the control unit that opens and closes an inlet to a secondary duct wherein the inlet is at the main duct, wherein the control unit commands, during an emergency mode of flight, the first switch to place the rotating electric machine in the generator mode, the airflow passage controller to close the inlet of the secondary duct, and the air outlet actuator to open the air outlet of the main duct.

14 Claims, 4 Drawing Sheets

EMERGENCY POWER GENERATION SYSTEM FOR AN AIRCRAFT

RELATED APPLICATION

This application incorporates by reference and claims priority to European patent application EP 24382788.8, filed Jul. 18, 2024.

TECHNICAL FIELD

The invention relates to emergency power generation systems for aircraft. The present invention also relates to an aircraft fuselage section comprising said emergency power generation system, an aircraft wing section comprising said emergency power generation system, and an aircraft comprising the aircraft fuselage section and/or the aircraft wing section.

BACKGROUND

Commercial transport jet aircraft typically include two or more primary turbine engines, which are used for the propulsion of the aircraft and also to power various electrical and hydraulic loads on the aircraft. These aircrafts also typically include at least one auxiliary power unit (APU), which is often mounted at the rear of the fuselage to generate auxiliary power in addition to or in lieu of the power provided by the primary engines of the aircraft. Accordingly, APUs can be used to provide power to an aircraft when the primary engines are not operational. This may occur, for instance, while the aircraft is awaiting departure at an airport gate. Furthermore, the APUs can also provide temporary power to start the primary engines during normal operations, and/or temporary emergency power during an engine-out condition or other emergency situations.

Furthermore, these commercial transport jet aircraft typically also include a Ram Air Turbine (commonly known by the acronym "RAT"), which is usually connected to an electrical generator, to be used as an emergency hydraulic or electrical power source.

The RAT is a small windmill-type propeller (also referred to as a fan) that is installed under normal conditions of a flight in an aircraft stowed in a compartment in the fuselage or wing. When required, the RAT is deployed manually or automatically outside the aircraft to drive either an electric generator, a hydraulic pump, or both installed in an aircraft. During the time between power loss and RAT deployment, aircraft batteries are generally used to power essential instrumentation. The RAT generates power from the airstream by ram pressure due to the speed of the aircraft.

In general, modern aircraft only employ a RAT in emergency situations, either in the event of a loss of hydraulic systems or following the loss of primary and auxiliary power sources. In the event of a simultaneous failure of both primary and auxiliary power sources, the RAT will provide power to vital systems of the aircraft, including flight controls or flight-critical instrumentation, navigation and communication equipment.

Some RATs produce only hydraulic power, which is subsequently used to power electrical generators.

The provision of a RAT represents a vital power emergency system in modern aircraft, as it can provide crucial support in the event of an emergency, thereby ensuring the safe operation of the aircraft. However, it does have several drawbacks. Some of the disadvantages associated with the use of a RAT include the noise it produces, the difficulty in identifying an appropriate and optimal location for it in an aircraft, its complex deployment mechanism, the hidden failure risk that leads to regular maintenance tasks and also its high drag when deployed since the RAT increases aerodynamic drag on the aircraft.

As a result, there is a need for an alternative solution to the provision of a RAT, which is capable of generating and supplying power to the vital aircraft systems in the event of an emergency, with a high degree of reliability.

SUMMARY OF THE INVENTION

The present invention may provide a solution for the aforementioned problems by an emergency power generation system for an aircraft.

In a first inventive aspect, the invention may be configured to provide an emergency power generation system for an aircraft, the aircraft comprising:

a fuselage section and/or a wing section;

a main duct arranged at least partially inside the fuselage section and/or the wing section, the main duct extending from an air inlet to an air outlet, wherein the air inlet and the air outlet are in fluid communication with the exterior of the aircraft; and a secondary duct arranged at least partially inside the fuselage section and/or the wing section, the secondary duct having an air inlet in fluid communication with the main duct at a connection region of the main duct, the connection region being located between the air inlet and the air outlet of the main duct;

wherein the emergency power generation system includes a rotating electric machine adapted to be arranged inside the main duct in a location between the air inlet and the connection region of the main duct, wherein the rotating electric machine is configured to operate in two different modes of operation which includes: (i) a generator mode, in which an airstream coming from the exterior of the aircraft induces a rotational movement of the rotating electric machine, thus resulting in the generation of electrical energy, and (ii) a motor mode, in which electric power supplied to the rotating electric machine causes a rotational movement of the rotating electric machine;

a control unit;

first switch, arranged in communication with the control unit, wherein the first switch are configured to selectively assign the generator mode or the motor mode of the rotating electric machine;

air outlet actuator arranged in communication with the control unit, wherein the air outlet actuator are configured to selectively open or close the air outlet of the main duct;

an airflow passage control is arranged in communication with the control unit, wherein the airflow passage controller are configured to selectively: (i) open the main duct at the connection region and close the inlet of the secondary duct; or (ii) close the main duct at the connection region and open the inlet of the secondary duct;

wherein the control unit is configured to command, for an emergency mode during a phase of flight:

the first switch for placing the rotating electric machine in the generator mode, the airflow passage control to close the inlet of the secondary duct and to leave the main duct open at the connection region, and the air outlet actuator to open the air outlet of the main duct, thereby allowing airstream from the main duct to be discharged to the exterior of the aircraft via the air outlet of the main duct.

In the context of the invention, the term "duct" refers to a tube, pipe, or channel through which a substance, in this case a gas, and in particular, air, is conveyed.

In the context of the invention, the term "rotating electric machine" refers to any DC or AC rotating electric machine that is capable of operating in both a generator mode and a motor mode and can be switched between these two modes. This type of "rotating electric machine" is referred to as "motor-generator duality." Motor-generator duality refers to the phenomenon where certain electrical machines can function as both a motor and a generator. This is possible because the underlying principles of operation are similar in both cases. The interaction between the magnetic fields created by the stator and the rotor results in either the conversion of electrical energy to mechanical energy (in a motor) or the conversion of mechanical energy to electrical energy (in a generator).

The emergency power generation system according to the first aspect of the invention is suitable for an aircraft that comprises a main and a secondary duct arranged at least partially inside a section of the aircraft, wherein this section of the aircraft may be a fuselage section and/or a wing section. This implies that a variety of configurations are possible, including the following: both the main and secondary ducts can be arranged inside the fuselage section, both the main and secondary ducts can be arranged inside the wing section, or one of the main or secondary ducts can be arranged in the fuselage section and the other in the wing section. Another option is that a portion of the main or secondary duct can be arranged within the fuselage section and the other portion within the wing section. The main duct extends from an air inlet to an air outlet, wherein the air inlet and the air outlet are in fluid communication with the exterior of the aircraft. The secondary duct has an air inlet in fluid communication with the main duct at a connection region of the main duct, wherein the connection region is located between the air inlet and the air outlet of the main duct.

The main duct and secondary duct can be configured in a variety of ways, including different diameters, shapes and lengths, depending on the specific circumstances of each case. For instance, the main and/or secondary duct can have a curved shape to adapt to the geometry of the fuselage section or the wing section of the aircraft. Furthermore, the main duct and/or the secondary duct can be configured differently according to the specific location of said ducts within the aircraft.

In the context of the present invention, the terms "main duct" and "secondary duct" are used to facilitate the identification of each duct. However, the designation of "main" or "secondary" does not imply any connotation regarding any comparative difference between the diameter or length of the duct. Consequently, the main duct and the secondary duct may have the same diameter and/or length and/or shape, or alternatively, they may have different diameters, lengths and/or shapes.

The emergency power generation system according to the first aspect of the invention comprises a rotating electric machine that is adapted to be arranged inside the main duct in a location between the air inlet and the connection region of the main duct. The rotating electric machine is configured to be operable in two different modes of operation, namely: a generator mode and a motor mode.

The selection of the location of the rotating electric machine inside the main duct, situated between the air inlet and the connection region of the main duct, may vary between different system designs, and, will depend on a number of factors, including the geometry of the main duct and its position in the aircraft, in addition to the power of the rotating electric machine.

When the rotating electric machine operates in the generator mode, the rotating electric machine operates by receiving mechanical energy from the airstream (which is an external mechanical source) entering from the outside of the aircraft via the air inlet at high speed. Consequently, the airstream at high speed induces a rotational movement of the rotating electric machine operating in a generator mode, resulting in the generation of electrical energy. In other words, it converts the external mechanical source into electrical energy. Conversely, when the rotating electric machine operates in the motor mode, the rotating electric machine operates by receiving electrical energy from an electric power source, causing a rotational movement of the rotating electric machine that allows accelerating the air flow.

The emergency power generation system according to the first aspect of the invention offers advantages over a conventional RAT. Firstly, the noise generated by the rotating electric machine is significantly reduced, due to the fact that the rotating electric machine is located inside the main duct, which serves to dampen the noise produced by the rotating parts of the rotating electric machine. Secondly, the rotating electric machine can be more easily positioned within different locations inside a section of an aircraft. Consequently, the choice of installation zone for the rotating electric machine inside the aircraft is more flexible in terms of its aerodynamic impact. This implies that the power generation of the rotating electric machine of the system is optimized according to a choice of a better installation zone in the aircraft in terms of aerodynamics. Thirdly, the rotating electric machine does not require the deployment of any additional mechanisms, as is the case with the RAT, so that the complications associated with the deployment of such mechanisms are circumvented. Fourthly, the electric rotating machine can be tested automatically with power injection from the aircraft, whereas the RAT requires a dedicated maintenance operation to be tested against hidden failure. Finally, the drag generated by the rotating electric machine of the emergency power generation system according to the first aspect of the invention is reduced in comparison to the high drag of a conventional RAT when it is deployed outside the aircraft for an emergency mode.

The emergency power generation system further comprises the control unit, the first switch, the air outlet actuator and the airflow passage controller.

The first switch are arranged in communication with the control unit. The first switch are configured to selectively assign the generator mode or the motor mode of the rotating electric machine. The switch between the motor and the generator mode and vice versa of the rotating electric machine comprises the change of the electrical connections and the change of the energy source of the rotating electric machine. Thus, the first switch is configured to selectively change the electrical connections and the energy source of the rotating electric machine between the two modes.

The air outlet actuator is arranged in communication with the control unit. The air outlet actuator is configured to selectively open or close the air outlet of the main duct, depending on the command received from the control unit.

The airflow passage controller is configured to selectively: (i) open the main duct at the connection region and close the inlet of the secondary duct; or (ii) close the main duct at the connection region and open the inlet of the secondary duct, depending on the command received from the control unit.

The air outlet actuator is connected to a first opening and closing mechanisms configured for opening and closing the air outlet of the main duct. The airflow passage controller is connected to a second opening and closing mechanisms configured for closing the air inlet of the secondary duct and leaving the main duct open at the connection region and vice versa. The first and second opening and closing mechanisms may be embodied as, for example, a shut-off damper or a shut-off valve. In the case of the mechanisms for closing the air inlet of the secondary duct and leaving the main duct open at the connection region and vice versa, it can be embodied as a single shut-off damper or a shut-off valve that actuates both actions, or it can be two separate shut-off dampers or shut-off valves.

As indicated, the emergency power generation system according to the first aspect of the invention can operate in two different modes: a non-emergency mode and an emergency mode. In the context of the invention, the term "emergency mode" refers to a situation during a flight in which there is a total electrical power failure on the aircraft; while the term "non-emergency mode" refers to a situation during a flight in which there is no power failure on the aircraft.

The control unit is configured to command, for an emergency mode during a phase of flight:

the first switch for placing the rotating electric machine in the generator mode, the airflow passage controller to close the inlet of the secondary duct and to leave the main duct open at the connection region, and the air outlet actuator to open the air outlet of the main duct, thereby allowing airstream from the main duct to be discharged to the exterior of the aircraft via the air outlet of the main duct.

In other words, for an emergency mode during a phase of flight, the rotating electric machine transitions to the generator mode. At the same time, the airstream entering the aircraft via the air inlet of the main duct flows through the main duct and it is discharged to the exterior of the aircraft via the air outlet of the main duct. Consequently, the rotating electric machine operating in the generator mode converts the mechanical energy of the rotational movement of the rotating electric machine induced by the airstream into electrical energy for the aircraft.

The emergency power generation system, according to the first aspect of the invention, provides crucial electrical energy support through the operation of a rotating electric machine in generator mode in a situation during a flight in which there is a power failure on the aircraft. This ensures the safe operation of the aircraft.

Furthermore, the emergency power generation system, according to the first aspect of the invention, is highly reliable, as it is driven by the airstream entering the aircraft from the outside and generates electrical energy. Moreover, the emergency power generation system constitutes an environmentally friendly and renewable emergency power source, as it is supplied by the airstream entering the aircraft from the outside.

Furthermore, the rotating electric machine of the emergency power generation system has a lower weight than a conventional RAT, which allows the emergency power generation system, according to the first aspect of the invention, to represent a more lightweight alternative to current RAT units.

In an embodiment, the control unit is also configured to command, for a non-emergency mode during a phase of flight: the first switch for placing the rotating electric machine in the motor mode, the airflow passage controller to close the main duct at the connection region and to leave the inlet of the secondary duct open, and the air outlet automatic actuator to close the air outlet of the main duct, thereby allowing airstream from the main duct to flow into the secondary duct.

In this embodiment where the rotating electric machine operates in motor mode, for a non-emergency mode during a phase of flight, it is necessary that an electric power is supplied to the rotating electric machine for the rotating electric machine to operate in motor mode. This results in a rotational movement that drives the rotating parts of the rotating electric machine. This rotational movement of the rotating parts of the rotating electric machine induces an acceleration of the air passing through the rotating electric machine, which is then directed from the main duct into the secondary duct. In a preferred embodiment, the outlet of the secondary duct is in fluid communication with the aircraft's ventilation system, thus allowing the accelerated airstream generated in the rotating electric machine to be directed through the aircraft's ventilation system towards the aircraft cabin.

Consequently, according to this embodiment, the emergency power generation system permits the use of the same system to operate in two different modes of operation. In other words, in addition to operating the system in an emergency mode during a phase of flight, the system can also operate in a different manner for a non-emergency mode during a phase of flight. This adaptability represents a significant advantage with respect to the conventional emergency system or devices, as for a non-emergency mode the system can also be in use; and, in particular, it can generate an accelerated airstream, which can be directed towards the aircraft cabin and be used as a ventilation air for the aircraft cabin.

In a particular embodiment, the rotating electric machine comprises: a stator, a rotor and a propeller (also referred to as a fan) arranged in connection with the rotor; so that:

in the generator mode, the rotational movement of the propeller caused by the airstream coming from the exterior of the aircraft is transmitted to the rotor, which rotates and thus generates electrical energy, and in the motor mode, electric power supplied to the rotating electric machine causes the rotational movement of the rotor, which rotation is transmitted to the propeller.

The propeller is a device comprising a central rotating shaft (also called central hub) and a plurality of blades.

In an embodiment, the stator of the rotating electric machine is implemented as the inner wall of a part of the main duct, the rotor is arranged inside the stator, and the propeller is arranged between the rotor shaft and the stator.

In an embodiment, the rotating electric machine is an Alternating Current (AC) rotating electric machine. In a particular embodiment, the AC rotating electric machine is an induction motor or a permanent magnet motor.

In a particular embodiment, the rotating electric machine is an AC rotating electric machine, wherein: the rotor is of a magnet rotor type comprising a disc-shaped element disposed around and at a distance from the rotor shaft, the disc-shaped element having magnets distributed at different locations within the disc-shaped element; and the stator comprises a set of stator coils.

In a particular embodiment of any of previously disclosed embodiments wherein the rotating electric machine comprises a stator, a rotor, and propeller arranged in connection with the rotor, the propeller comprises a central rotating shaft (also called central hub) that is directly connected to a rotating shaft of the rotor. In this embodiment, the central rotating shaft of the plurality of blades and the rotating shaft of the rotor rotate at the same speed. In an alternative embodiment, the central rotating shaft of the propeller is indirectly connected to a rotating shaft of the rotor by a gearbox. The gearbox enables the adjustment of the rotation speed between the two rotating elements (i.e. the central rotating shaft of the propeller and the rotating shaft of the rotor) to be adjusted. In this alternative embodiment, the central rotating shaft of the propeller and the rotating shaft of the rotor can rotate at different speeds.

In an embodiment, the emergency power generation system comprises a rotation speed measurement sensor in communication with the propeller, wherein the rotation speed measurement sensor is configured to measure the rotation speed of the propeller. The rotation speed measurement sensor is capable of detecting errors in the propeller.

In an embodiment, the emergency power generation system comprises an angle of attack variation system in communication with the control unit, wherein the angle of attack variation system is configured to modify the angle of attack of the plurality of blades of the propeller versus the airflow. The angle of attack variation system allows a modification of the angle of attack of the plurality of blades according to a particular need for optimal orientation of the rotor blades. Thus, the control unit is further configured to command the angle of attack variation system to modify the angle of attack of the plurality of blades. Angle of attack refers to the angle between the propeller blade chord line and the plane of rotation of the propeller.

The angle of attack variation system is advantageous in that it allows the angle of attack of the blades of the propeller to be adjusted according to specific needs, thereby increasing the efficiency of the propeller and consequently of the rotating electric machine.

In a particular embodiment, apart from the angle of attack variation system, the emergency power generation system further comprises:

an air speed sensor arranged at a location inside the main duct between the air inlet of the main duct and the rotating electric machine, wherein the air speed sensor is configured to measure the speed of the input airstream at said location; and angle of attack controller connected to the air speed sensor and to the angle of attack variation system, wherein the angle of attack controller are configured to receive the speed measurement from the air speed sensor, and to command the angle of attack variation system to modify an angle of attack of the plurality of blades of the propeller depending on the comparison of the speed measurement with a predetermined airstream speed value.

The angle of attack variation system, in conjunction with the air speed sensor and the angle of attack controller, enables the angle of attack of the blades of the propeller to be adjusted in real-time according to the measured speed of the input airstream. This allows for the angle of attack of the blades of the propeller to be adjusted in a more efficient manner, thereby increasing the efficiency of the propeller and consequently of the rotating electric machine.

In an embodiment, the emergency power generation system comprises an electric or a hydraulic motor being connected to the rotating electric machine, wherein the electric or hydraulic motor is configured to supply electric power to the rotating electric machine when the rotating electric machine is in the non-emergency mode.

In an embodiment, the emergency power generation system comprises an electric power source.

In an embodiment when the emergency power generation system comprises an electric power source, the electric power source comprises a power converter, and at least one battery in connection with the output of the power converter;

the emergency power generation system, further comprises:

a second switch configured to selectively connect or disconnect the output of the rotating electric machine to the power converter;

the control unit is also configured to command, for the non-emergency mode during a phase of flight:

when the rotating electric machine is in the generator mode, the second switch to connect the output of the rotating electric machine to the power converter, thereby charging the at least one battery with the generated electric energy of the rotating electric machine.

Advantageously, this embodiment of the emergency power generation system, which comprises a power converter, at least one battery and second switch, offers an additional functionality: namely, the charging of the at least one battery with the generated electric energy of the rotating electric machine for the non-emergency mode during a phase of flight.

In an embodiment, when the rotating electric machine is an AC rotating electric machine, the power converter is an AC/DC power converter.

In an embodiment of the emergency power generation system, which comprises at least one battery, a power converter and second switch, the connection between the power converter and the rotating electric machine through the second switch is bidirectional. Thus, the control unit is also configured to command, for the emergency mode during a phase of flight: when the rotating electric machine is in the generator mode, the second switch to connect the output of the power converter to the rotating electric machine, thereby adding power from the at least one battery to the rotating electric machine.

In other embodiments, the electric power source is a supercapacitor or a fuel cell.

In an embodiment in which the emergency power generation system comprises an electric power source, the emergency power generation system further comprises: at least one airstream sensor configured to measure the airstream flow inside the main duct, and a third switch for connecting the rotating electric machine and/or the electric power source to an aircraft electrical circuit, wherein the control unit is in communication with the at least one airstream sensor and with the third switch, wherein the control unit is configured to, in a flight phase, for the emergency mode: set the third switch to connect the electric power source if the airstream flow value measured by the at least one airstream flow sensor is below a predetermined threshold.

In this embodiment, the electric power source serves to address potential issues with insufficient airflow entering the main duct. This is particularly relevant in the event that the airflow entering from the air outlet of the main duct decreases below a predetermined threshold, which could result in the rotating electric machine being unable to operate at an optimal level. This could occur, for example, if the aircraft undergoes a change in position. In the event that the at least one airstream sensor measures that the airflow inside the main duct is below a predetermined threshold, the third switch, which is commanded by the control unit, will connect the electric power source and disconnect the rotating electric machine. Conversely, in other situations, the control unit will command the third switch to connect the rotating electric machine and disconnect the electric power source. This embodiment of the system, which includes an electric power source, serves as a backup power source in the event of a clogging issue, thereby providing redundancy.

This embodiment of the emergency power generation system, which comprises an electric power source, at least one airstream sensor and third switch, provides a safeguard in terms of the electric power source for the aircraft in the event of insufficient airflow entering the aircraft from the main duct during flight.

In a particular embodiment of the emergency power generation system, in which the electric power source comprises the power converter and the at least one battery, the system exhibits an additional functionality of, in the event of insufficient power from the rotating electric machine operating in the generator mode, the at least one battery with the associated power converter operates simultaneously with the rotating electric machine to supplement the power supply of the rotating electric machine operating in the generator mode, thereby ensuring the continued operation of the aircraft. This is particularly relevant during low-airflow approach phases.

In a second inventive aspect, the invention provides an aircraft fuselage section comprising:

a main duct at least partially arranged within the aircraft fuselage section, the main duct extending from an air inlet to an air outlet, wherein the air inlet and the air outlet are in fluid communication with the exterior of the aircraft;

a secondary duct at least partially arranged within the aircraft fuselage section, the secondary duct having an air inlet being connected to and in fluid communication with the main duct at a connection region of the main duct, the connection region being located between the air inlet and the air outlet of the main duct;

first opening and closing mechanisms configured for opening and closing the air outlet of the main duct;

second opening and closing mechanisms configured for closing the air inlet of the secondary duct and leaving the main duct open at the connection region, and vice versa; and an emergency power generation system according to any one of the disclosed embodiments, wherein the rotating electric machine of the emergency power generation system is arranged inside the main duct in a location between the air inlet and the connection region.

In a third inventive aspect, the invention provides an aircraft wing section comprising:

a main duct at least partially arranged within the aircraft wing section, the main duct extending from an air inlet to an air outlet, wherein the air inlet and the air outlet are in fluid communication with the exterior of the aircraft;

a secondary duct at least partially arranged within the aircraft wing section, the secondary duct having an air inlet being connected to and in fluid communication with the main duct at a connection region of the main duct, the connection region being located between the air inlet and the air outlet of the main duct;

first opening and closing mechanisms configured for opening and closing the air outlet of the main duct;

second opening and closing mechanisms configured for closing the air inlet of the secondary duct and leaving the main duct open at the connection region, and vice versa; and an emergency power generation system according to any one of the disclosed embodiments, wherein the rotating electric machine of the emergency power generation system is arranged inside the main duct in a location between the air inlet and the connection region.

As previously indicated, the first opening and closing mechanisms and the second opening and closing mechanisms may be embodied as, for example, a shut-off damper or a shut-off valve. In the case of the second opening and closing mechanisms, it can be embodied as a single shut-off damper or a shut-off valve that actuates both actions (i.e. closing the air inlet of the secondary duct and leaving the main duct open at the connection region, or vice versa); or, alternatively, it can be two separate shut-off dampers or shut-off valves wherein one of them closes or opens the air inlet of the secondary duct and the other one leaves the main duct open or closed at the connection region.

In the case of the second opening and closing mechanisms, the single or separate mechanisms are arranged and configured to close or open the main duct at the connection region in such a way that the closure of the main duct in the connection region occurs downstream of the secondary duct inlet, considering the direction from the air inlet to the air outlet.

In a fourth inventive aspect, the invention provides an aircraft comprising the aircraft fuselage section according to the disclosed embodiment and/or the aircraft wing section according to any one of the disclosed embodiments.

All the features described in this specification (including the claims, description and drawings) can be combined in any combination, with the exception of combinations of such mutually exclusive features.

DESCRIPTION OF THE DRAWINGS

These and other characteristics and advantages of the invention will become clearly understood in view of the detailed description of the invention which becomes apparent from preferred embodiments of the invention, given just as examples and not being limited thereto, with reference to the drawings.

DETAILED DESCRIPTION OF THE INVENTION

Figure 1:
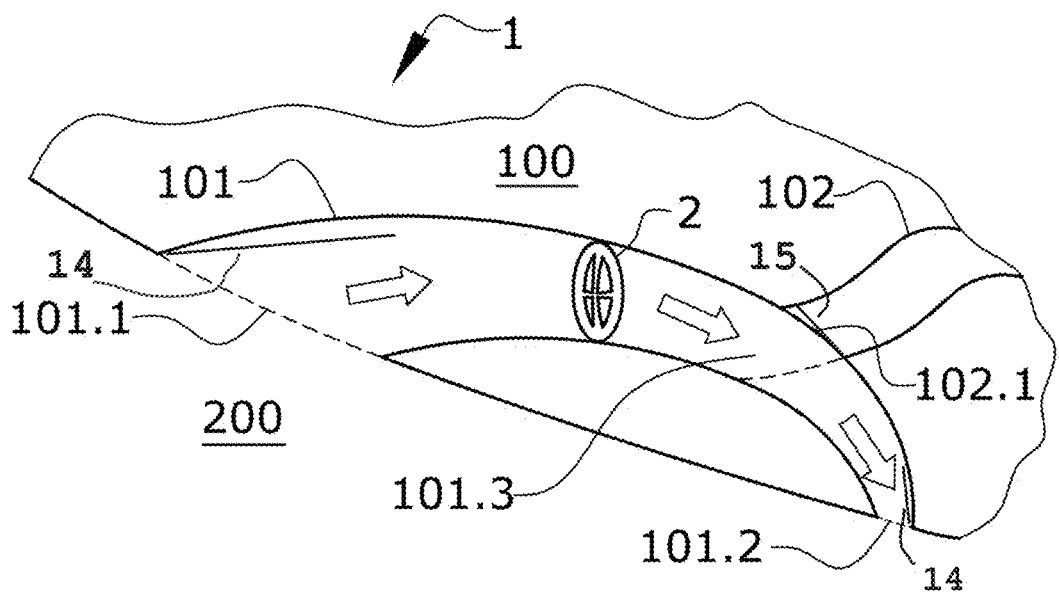
FIG. 1 This figure shows a schematic representation of a side view of an emergency power generation system for an aircraft according to an embodiment of the invention, for an emergency mode during a phase of flight.
Figure 2:
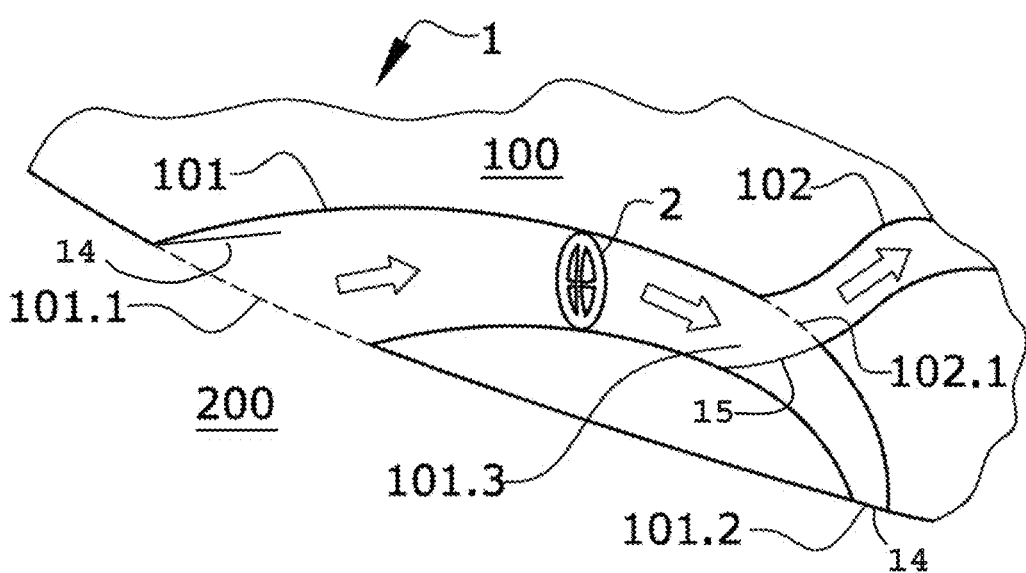
FIG. 2 This figure shows a schematic representation of a side view of an emergency power generation system for an aircraft according to the embodiment shown in FIG. 1, for a non-emergency mode during a phase of flight.

FIGS. 1 and 2 each show a schematic representation of an emergency power generation system (1) for an aircraft (100) according to an embodiment of the present invention in two different modes: for an emergency mode and for a non-emergency mode during a phase of flight, respectively.

The aircraft (100) for which the emergency power generation system (1) is provided comprises: a section of the aircraft (100) being a fuselage section and/or a wing section, a main duct (101) and a secondary duct (102). The main duct (101) is arranged inside the section of the aircraft (100), the main duct (101) extending from an air inlet (101.1) to an air outlet (101.2), wherein the air inlet (101.1) and the air outlet (101.2) are both in fluid communication with the exterior (200) of the aircraft (100). The secondary duct (102) is also arranged inside the section of the aircraft (100), the secondary duct (102) has an air inlet (102.1) in fluid communication with the main duct (101) at a connection region (101.3) of the main duct (101), the connection region (101.3) being located between the air inlet and the air outlet (101.2) of the main duct (101). FIGS. 1 and 2 show a schematic representation of the main (101) and secondary ducts (102) according to a possible embodiment, having both ducts (101, 102) a curved shape.

The emergency power generation system (1) comprises a rotating electric machine (2), a control unit (3), first switch (4), air outlet actuator (5) and airflow passage controller (6).

The rotating electric machine (2), shown in FIGS. 1 and 2, is adapted to be arranged inside the main duct (101) in a location between the air inlet (101.1) and the connection region (101.3) of the main duct (101). The rotating electric machine (2) is configured to operate in two different modes of operation, namely: a generator mode and a motor mode. In the generator mode, an airstream (which is depicted with an arrow) entering the aircraft (100) from the exterior (200) induces a rotational movement of the rotating electric machine (2), thus resulting in the generation of electrical energy. On the other hand, when the rotating electric machine (2) switches to the motor mode, electric power supplied to the rotating electric machine (2) causes a rotational movement of the rotating electric machine (2).

With reference to FIG. 1, which depicts the system (1) in an emergency mode, the rotating electric machine (2) is operating in the generator mode. This results in an airstream entering the main duct (101) from the exterior (200) of the aircraft (100) via the air inlet (101.1). This airstream passes through the rotating electric machine (2), inducing a rotational movement of the rotating electric machine (2). This rotational movement of the rotating electric machine (2) is converted to electrical energy. The airstream at the outlet of the rotating electric machine (2) continues to flow through the main duct (101) until it is expelled from the aircraft (100) via the air outlet (101.2).

With reference to FIG. 2, which depicts the system (1) in a non-emergency mode, the rotating electric machine (2) is operating in the motor mode. In this mode, an electric power supply (10-FIG. 7) is provided to the rotating electric machine (2), resulting in a rotational movement of the rotating electric machine (2). Consequently, an airstream entering to the main duct (101) from the exterior (200) of the aircraft (100) via the air inlet (101.1) passes through the rotating electric machine (2), which is rotating due to the electric power. This rotation of the rotating electric machine (2) accelerates the airstream as it passes through the rotating electric machine (2) so that at the outlet of the rotating electric machine (2) the airstream is accelerated in comparison to the initial airstream. This accelerated airstream continues to flow into the second duct (102), since the main duct (101) is closed at the connection region (101.3). Therefore, in this non-emergency mode, the airstream is not expelled from the aircraft (100) via the air outlet (101.2).

Figure 3:
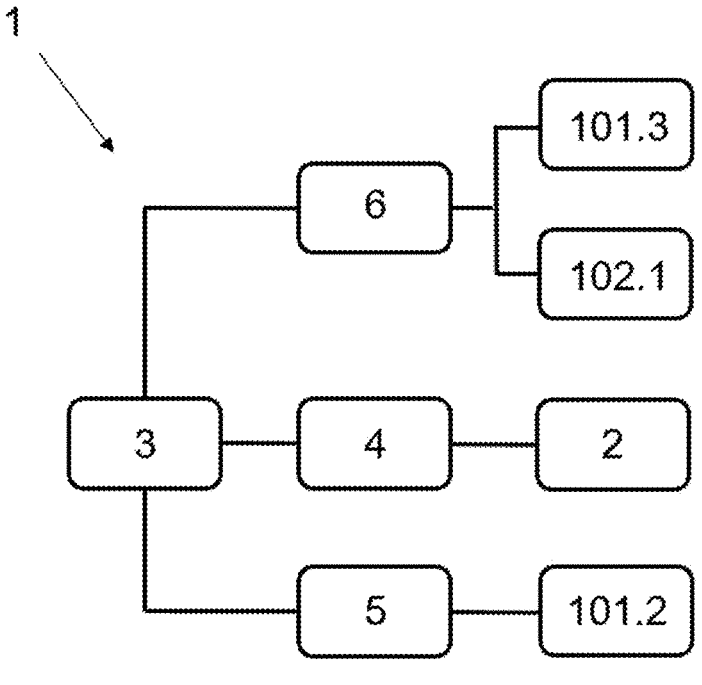
FIG. 3 This figure shows a diagram of the interconnections between the various elements of an emergency power generation system for an aircraft according to an embodiment of the invention.

FIG. 3 shows a diagram illustrating the interconnections between the various elements of an emergency power generation system (1) for an aircraft according to an embodiment of the invention. The emergency power generation system (1) comprises a control unit (3), first switch (4), air outlet actuator (5), airflow passage controller (6) and a rotating electric machine (2). The first switch (4), the air outlet actuator (5) and the airflow passage controller (6) are arranged in communication with the control unit (3). The first switch (4) is connected to the rotating electric machine (2) and is configured to selectively assign the generator mode or the motor mode of the rotating electric machine (2) depending on the command of the control unit (3). The air outlet actuator (5) are configured to selectively open or close the air outlet (101.2) of the main duct (101) depending on the command of the control unit (3). The airflow passage controller (6) is configured, depending on the command of the control unit (3), to selectively: (i) open the main duct (101) at the connection region (101.3) and close the inlet (102.1) of the secondary duct (102); or (ii) close the main duct (101) at the connection region (101.3) and open the inlet (102.1) of the secondary duct (102).

The aircraft (100) for which the emergency power generation system (1) is provided comprises first and second opening and closing mechanisms, in addition to an aircraft fuselage section and/or wing section, a main duct (101) and a secondary duct (102). The first opening and closing mechanisms (14) are configured for opening and closing the air outlet (101.2) of the main duct (101). The second opening and closing mechanisms (15) are configured for closing the air inlet (102.1) of the secondary duct (102) and leaving the main duct (101) open at the connection region (101.3), and vice versa.

The air outlet actuator is connected to the first opening and closing mechanisms, which are configured for selectively opening and closing the air outlet (101.2) of the main duct (101). The airflow passage controller is connected to the second opening and closing mechanisms, which are configured for selectively closing the air inlet (102.1) of the secondary duct (102) and leaving the main duct (101) open at the connection region (101.3), and vice versa. Only it is indicated by a discontinuous line when the air inlet of the secondary duct is open (see FIG. 2) and a continuous line when it is closed (see FIG. 1). Also, it is indicated by a discontinuous line when the main duct (101) is open at the connection region (101.3) (see FIG. 1) and with a continuous line when it is closed (see FIG. 2). Similarly, it is indicated by a discontinuous line when the air outlet (101.2) of the main duct (101) is open (see FIG. 1) and by a continuous line when it is closed (see FIG. 2). These first and second opening and closing mechanisms may be embodied as, for example, a shut-off damper or a shut-off valve. In the case of the second opening and closing mechanisms, it can be embodied as a single shut-off damper or a shut-off valve that actuates both actions, or it can be two separate shut-off dampers or shut-off valves.

The control unit (3) is configured to command, for an emergency mode during a phase of flight, such as the embodiment shown in FIG. 1: (i) the first switch (4) for placing the rotating electric machine (2) in the generator mode, the airflow passage controller (6) to close the inlet (102.1) of the secondary duct (102) and to leave the main duct (101) open at the connection region (101.3), and (ii) the air outlet actuator (5) to open the air outlet (101.2) of the main duct (101), thereby allowing airstream from the main duct (101) to be discharged to the exterior of the aircraft (100) via the air outlet (101.2) of the main duct (101).

In an embodiment, such as the embodiment shown in FIG. 2, the control unit (3) is also configured to command, for a non-emergency mode during a phase of flight: the first switch (4) for placing the rotating electric machine (2) in the motor mode, the airflow passage control (6) to close the main duct (101) at the connection region (101.3) and to leave the inlet of the secondary duct (102) open, and the air outlet actuator (5) to close the air outlet of the main duct (101), thereby allowing airstream from the main duct (101) to flow into the secondary duct (102).

In an embodiment, the rotating electric machine (2) comprises: a stator (2.1), a rotor (2.2), a propeller (2.3) arranged in connection with the rotor (2.2); so that: in the generator mode, the rotational movement of the propeller (2.3) caused by the airstream coming from the exterior (200) of the aircraft (100) is transmitted to the rotor (2.2), which rotates and thus generates electrical energy, and in the motor mode, electric power supplied to the rotating electric machine (2) causes the rotational movement of the rotor (2.2), which rotation is transmitted to the propeller (2.3).

In an embodiment, the rotating electric machine (2) is an AC rotating electric machine.

Figure 4:
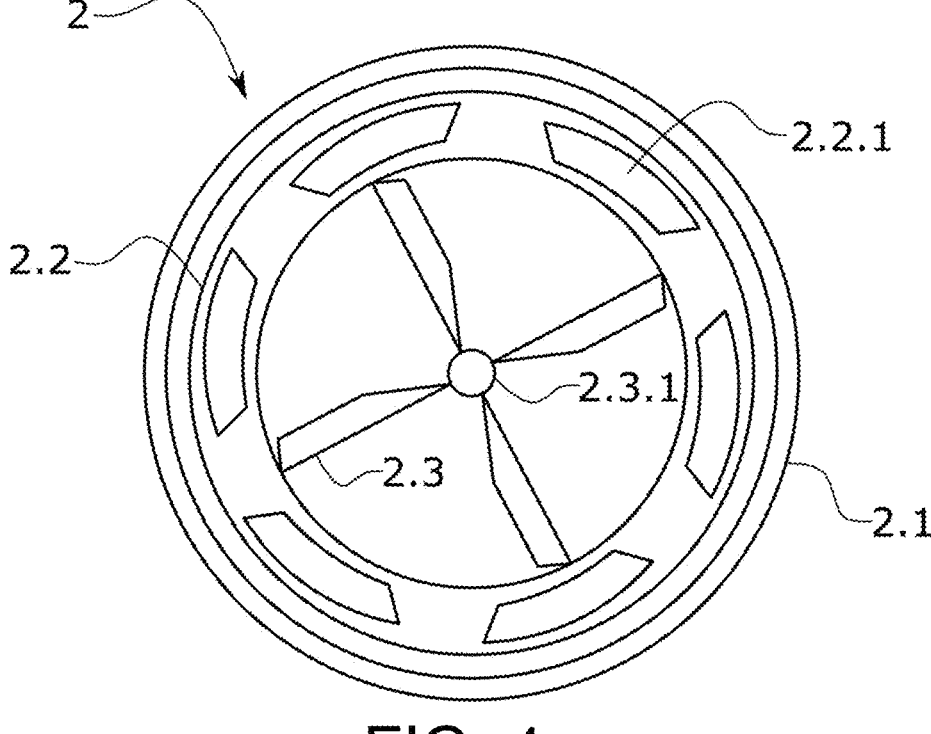
FIG. 4 This figure shows a schematic representation of a front view of a rotating electric machine of an emergency power generation system for an aircraft according to an embodiment of the invention.

FIG. 4 shows a schematic representation of a front view of a rotating electric machine (2) of the emergency power generation system (1) for an aircraft (100) according to an embodiment of the invention.

In a particular embodiment, such as the embodiment depicted in FIG. 4, the stator (2.1) of the AC rotating electric machine (2) is implemented as the inner wall of a part of the main duct (101), the rotor (2.2) is arranged inside the stator (2.1), and the propeller (2.3) is arranged between the rotor (2.2) shaft and the stator (2.1).

In this embodiment depicted in FIG. 4, the propeller (2.3) comprises a central rotating shaft (2.3.1), which is either directly or indirectly connected by a gearbox to a rotating shaft of the rotor (2.2).

In the embodiment shown in FIG. 4, the rotor (2.2) is of a magnet rotor type comprising a disc-shaped element disposed around and at a distance from the rotor shaft, the disc-shaped element having magnets (2.2.1) distributed at different locations within the disc-shaped element; and the stator (2.3) comprises a set of stator coils (not shown). In the specific embodiment depicted in FIG. 4, a total of six magnets (2.2.1) are provided, which are arranged in a regular distribution around the disc-shaped element. Other embodiments may include a different number of magnets.

In some embodiments, the emergency power generation system (1) comprises a rotation speed measurement sensor (not shown) in communication with the propeller (2.3), the rotation speed measurement sensor being configured to measure the rotation speed of the propeller (2.3).

In an embodiment, the emergency power generation system (1) comprises an angle of attack variation system in communication with the control unit (3), the angle of attack variation system (11) being configured to modify the angle of attack of the plurality of blades of the propeller (2.3) versus the airflow. In a particular embodiment, shown in FIG. 5, in addition to the angle of attack variation system (11), the emergency power generation system (1) further comprises: (i) an air speed sensor (9) arranged at a location inside the main duct (101) between the air inlet (101.1) of the main duct (101) and the rotating electric machine (2), wherein the air speed sensor (9) is configured to measure the speed of the input airstream at the location (9); and (ii) an angle of attack controller (12) connected to the air speed sensor (9) and to the angle of attack variation system (11), wherein the angle of attack controller (12) is configured to receive the speed measurement from the air speed sensor (9), and to command the angle of attack variation system to modify an angle of attack of the propeller (2.3) depending on the comparison of the speed measurement with a predetermined airstream speed value.

Figures 5, 6:
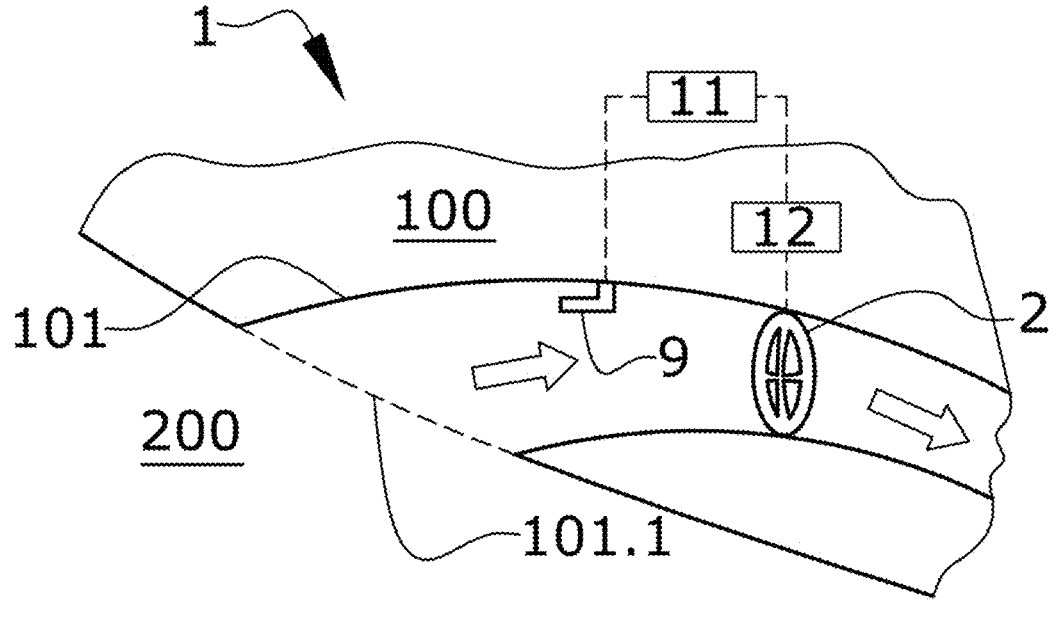
FIG. 5 This figure shows a schematic representation of a side view of an emergency power generation system for an aircraft according to an embodiment of the invention.
FIG. 6 This figure shows a diagram of the interconnections between the rotating electric machine, the power converter and the at least one battery of an emergency power generation system for an aircraft according to an embodiment of the invention.

In an embodiment, shown in FIG. 6, the emergency power generation system (1) includes an electric power source, comprising: a power converter (7), and at least one battery (8) in connection with the output of the power converter (7), a second switch (13) configured to selectively connect or disconnect the output of the rotating electric machine (2) to the power converter (7); wherein the control unit (3) is also configured to command, for the non-emergency mode during a phase of flight: when the rotating electric machine (2) is in the generator mode, the second switch to connect the output of the rotating electric machine (2) to the power converter (7), thereby charging the at least one battery (8) with the generated electric energy of the rotating electric machine (2).

FIG. 6 illustrates the rotating electric machine (2) being connected by the second switch (13) to a power converter (7), which in turn is connected to the at least one battery (8), with both connections being bidirectional. In this particular embodiment of FIG. 6, the electric power source can operate in two modes: firstly, to charge the at least one battery (8) with the generated electric energy from the rotating electric machine (2), and secondly, to utilize the charged electric energy from the at least one battery (8) to supply an electric power to the rotating electric machine when the rotating electric machine (2) is in the non-emergency mode.

In an embodiment, the emergency power generation system (1) comprises an electric or a hydraulic motor (not shown) being connected to the rotating electric machine (2), wherein the electric or hydraulic motor is configured to supply an electric power to the rotating electric machine (2) when the rotating electric machine (2) is in the non-emergency mode.

In an embodiment (not shown), the emergency power generation system (1) comprises: at least one airstream sensor (16) configured to measure the airstream flow inside the main duct (101), and third switch for connecting the rotating electric machine (2) and/or the electric power source to an aircraft electrical circuit; wherein the control unit (3) is in communication with the at least one airstream sensor (16 in FIG. 7) and with the third switch, wherein the control unit (3) is configured to, in a flight phase, for the emergency mode set the third switch to connect the electric power source if the airstream flow value measured by the at least one airstream sensor is below a predetermined threshold.

Figure 7:
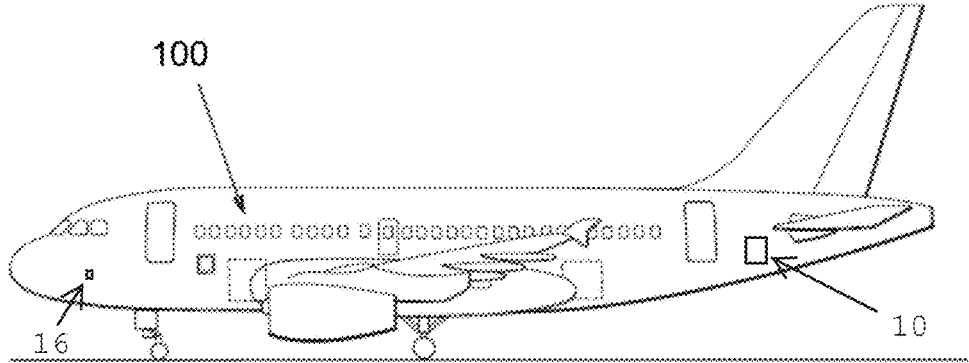
FIG. 7 This figure shows a schematic representation of an aircraft comprising an emergency power generation system according to an embodiment of the invention.

FIG. 7 shows a schematic representation of a side view of an aircraft (100) comprising an emergency power generation system (1) according to an embodiment of the invention. Different embodiments of the emergency power generation system (1) can be comprised within the aircraft (100), such as at a fuselage section and at a wing section.

In a particular case of an aircraft fuselage section, it comprises, in addition to an emergency power generation system (1) having the rotating electric machine (2) of the emergency power generation system (1) arranged inside the main duct (101) in a location between the air inlet and the connection region (101.3), a main duct (101) and a secondary duct (102). Both main and secondary ducts (101, 102) are at least partially arranged within the fuselage section of the aircraft (100). Furthermore, the aircraft fuselage section comprises first opening and closing mechanisms configured for opening and closing the air outlet (101.2) of the main duct (101). Furthermore, the aircraft fuselage section comprises second opening and closing mechanisms configured for closing the air inlet (102.1) of the secondary duct (102) and leaving the main duct (101) open at the connection region (101.3), and vice versa.

Similarly, in a particular case of an aircraft wing section, it comprises, in addition to an emergency power generation system (1) having the rotating electric machine (2) of the emergency power generation system (1) arranged inside the main duct (101) in a location between the air inlet and the connection region (101.3), a main duct (101) and a secondary duct (102). Both main and secondary ducts (101, 102) are at least partially arranged within the wing section of the aircraft (100). Furthermore, the aircraft wing section comprises first opening and closing mechanisms configured for opening and closing the air outlet (101.2) of the main duct (101). Furthermore, the aircraft wing section comprises second opening and closing mechanisms configured for closing the air inlet (102.1) of the secondary duct (102) and leaving the main duct (101) open at the connection region (101.3), and vice versa.

As shown in FIGS. 1 and 2, the main duct (101) extends from an air inlet (101.1) to an air outlet (101.2), with the air inlet (101.1) and the air outlet (101.2) being in fluid communication with the exterior (200) of the aircraft (100). The secondary duct (102) has an air inlet (102.1) that is connected to and in fluid communication with the main duct (101) at a connection region (101.3) of the main duct (100). The connection region (101.3) is located between the air inlet (101.1) and the air outlet (101.2) of the main duct (101). The rotating electric machine (2) of the emergency power generation system (1) is arranged inside the main duct (101) in a location between the air inlet and the connection region (101.3) of the main duct (101).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An emergency power generation system for an aircraft, wherein the aircraft includes:

a fuselage section and/or a wing section;

a main duct at least partially arranged inside the fuselage section and/or the wing section, the main duct extending from an air inlet to an air outlet, wherein the air inlet and the air outlet are in fluid communication with an exterior of the aircraft and wherein external air enters the air inlet and flows through the main duct; and a secondary duct at least partially arranged inside the fuselage section and/or the wing section, the secondary duct having a secondary air inlet in fluid communication with the main duct at a connection region of the main duct, wherein the connection region is between the air inlet and the air outlet of the main duct;

wherein the emergency power generation system comprises:

a rotating electric machine adapted to be arranged inside the main duct between the air inlet and the connection region of the main duct, wherein the rotating electric machine is configured to operate in:

a generator mode in which air from the exterior of the aircraft flows through the main duct and induces rotational movement of the rotating electric machine to generate electrical energy, and a motor mode in which electric power supplied to the rotating electric machine causes rotational movement of the rotating electric machine;

a control unit;

a first switch in communication with the control unit, wherein the first switch is configured to selectively cause the rotating electric machine to operate in the generator mode and the motor mode;

air outlet actuator in communication with the control unit, wherein the air outlet actuator is configured to selectively open and/or close the air outlet of the main duct;

an airflow passage controller in communication with the control unit, wherein the airflow passage controller is configured to selectively:

(i) open the main duct at the connection region and close the inlet of the secondary duct; and/or (ii) close the main duct at the connection region and open the inlet of the secondary duct;

wherein the control unit is configured to cause during an emergency mode occurring during flight of the aircraft:

the first switch to place the rotating electric machine in the generator mode, the airflow passage controller to close the inlet of the secondary duct, and the air outlet actuator to open the air outlet of the main duct, wherein external air from outside the aircraft enters through the air inlet, flows through the main duct, drives rotation of the rotating electric machine and exits from air outlet to outside of the aircraft, and wherein the rotation of the rotating electric machine generates electricity supplied to the aircraft.

2. The emergency power generation system according to claim 1, wherein the control unit is configured to command, for a non-emergency mode during the flight of the aircraft:

the first switch to place the rotating electric machine in the motor mode, the airflow passage controller to close the main duct at the connection region and to leave the inlet of the second-ary duct open, and the air outlet actuator to close the air outlet of the main duct to allow the airstream flowing through the main duct to flow into the secondary duct.

3. The emergency power generation system according to claim 1, wherein the rotating electric machine includes: a stator, a rotor, and a propeller configured to rotate with the rotor;

wherein:

during the generator mode, rotation of the propeller is driven by external air flowing through the main duct from the exterior of the aircraft and the rotation of the propeller drives rotation of the rotor and results in electrical energy generation by the rotating electric machine, and during the motor mode, the electric power supplied to the rotating electric machine rotates the rotor which drives rotation of the propeller.

4. The emergency power generation system according to claim 3, wherein:

the stator is implemented forms part of an inner wall of the main duct, the rotor is within the stator, and the propeller is between the rotor shaft and the stator along a radius of the rotor shaft.

5. The emergency power generation system according to claim 3, further comprising a rotation speed measurement sensor in communication with the propeller, the rotation speed measurement sensor being configured to measure a rotational speed of the propeller.

6. The emergency power generation system according to claim 1, wherein the rotating electric machine is an Alter-nating Current (AC) rotating electric machine.

7. The emergency power generation system according to claim 6, wherein:

the rotor is a magnet rotor including a disc-shaped ele-ment disposed around and at a distance from the rotor shaft, the disc-shaped element with magnets distributed within the disc-shaped element; and the stator comprises conductive stator coils.

8. The emergency power generation system according to claim 1, further comprising an angle of attack variation system in communication with the control unit, wherein the angle of attack variation system is configured to modify an angle of blades of the propeller with respect to a direction of external air flowing through the main duct and approaching the propeller.

9. The emergency power generation system according to claim 8, further comprising:

an air speed sensor inside the main duct between the air inlet of the main duct and the rotating electric machine, wherein the air speed sensor is configured to measure a speed of the airstream in the main duct; and an angle of attack controller configured to:

receive speed data indicating the speed of the airstream as measured by the air speed sensor;

determine an angle of attack based on the speed data, and command the angle of attack variation system to adjust the angle of attack of the blades of the propeller to conform to the angle of attack determined by the angle of attack controller.

10. The emergency power generation system according to claim 1, further comprising an electric power source within the aircraft.

11. The emergency power generation system according to claim 10, wherein:

the electric power source comprises a power converter, and a battery electrically connected to the power con-verter;

a second switch configured to selectively connect or disconnect the rotating electric machine and the power converter; and the control unit is configured to cause the non-emergency mode:

the first switch to place the rotating electric machine is in the generator mode, the second switch to electrically connect the rotating electric machine to the power converter, and electrical power generated by the rotating electric machine to be applied to charge the battery.

12. The emergency power generation system according to claim 10, further comprising:

an airstream sensor configured to measure airflow in the main duct, and a third switch configured to connect the rotating electric machine and/or the electric power source to an aircraft electrical circuit;

wherein the control unit is in communication with the airstream sensor and the third switch, wherein the control unit is configured to set the third switch to connect the electric power source if the airflow measured by the airstream sensor is below a predetermined threshold.

13. An aircraft comprising:

a fuselage section and a wing section;

a main duct at least partially arranged in the fuselage section or the wing section, wherein the main duct extends within the aircraft from an air inlet on an outer skin of the aircraft to an air outlet on the outer skin;

a secondary duct at least partially within the fuselage section and/or the wing section, wherein the secondary duct includes an air inlet in fluid communication with the main duct at a connection region of the main duct, wherein the connection region is between the air inlet and the air outlet of the main duct;

an emergency power generation system comprising:

a rotating electric machine arranged in the main duct between the air inlet and the connection region of the main duct, wherein the rotating electric machine is configured to operate:

a generator mode in which external air enters the air inlet flows through the main duct, rotates the rotating electric machine to generate electrical energy, is discharged from the main duct through the air outlet and a motor mode in which electric power supplied to the rotating electric machine rotates the rotating elec-tric machine;

a control unit;

a first switch in communication with the control unit, wherein the first switch is configured to selectively cause the rotating electrical machine to operate in the generator mode and the motor mode;

air outlet actuator in communication with the control unit, wherein the air outlet actuator is configured to selectively open and/or close the air outlet of the main duct;

an airflow passage controller in communication with the control unit, wherein the airflow passage con-troller is configured to selectively:

(i) open the main duct at the connection region and close the inlet of the secondary duct; and/or (ii) close the main duct at the connection region and open the inlet of the secondary duct;

wherein the control unit is configured to cause during an emergency mode during flight of the aircraft:

the first switch to place the rotating electric machine in the generator mode, the airflow passage controller to close the inlet of the secondary duct, and the air outlet actuator to open the air outlet of the main duct, wherein air from outside the aircraft enters through the air inlet, flows as an airstream through the main duct and drives rotation of the rotating electric machine and the airstream flows form the main duct through the air outlet to outside of the aircraft, and wherein the rotation of the rotating electric machine generates electricity supplied to the aircraft.

14. The aircraft of claim 13, wherein:

the main duct is in the wing section;

the air inlet and the air outlet are at a skin of the wing section, and the secondary duct is at least partially arranged within the aircraft wing section.

*   *   *   *   *